United States Patent
Szajewski et al.

(10) Patent No.: US 6,640,057 B1
(45) Date of Patent: Oct. 28, 2003

(54) IMAGING USING SILVER HALIDE FILMS WITH INVERSE MOUNTED MICRO-LENS AND SPACER

(75) Inventors: Richard P. Szajewski, Rochester, NY (US); Lyn M. Irving, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/281,654

(22) Filed: Oct. 28, 2002

(51) Int. Cl.⁷ .......................... G03B 17/00; G03B 41/00
(52) U.S. Cl. ....................................... 396/322; 396/440
(58) Field of Search .............................. 396/332, 333, 396/322, 330, 327, 306, 307, 305, 440

(56) References Cited

U.S. PATENT DOCUMENTS

| 992,151 A | 5/1911 | Berthon |
|---|---|---|
| 1,746,584 A | 2/1930 | Fournier |
| 1,749,278 A | 3/1930 | Frederick |
| 1,824,353 A | 9/1931 | Jensen |
| 1,838,173 A | 12/1931 | Chretien |
| 1,849,036 A | 3/1932 | Ernst |
| 1,942,841 A | 1/1934 | Shimizu |
| 1,985,731 A | 12/1934 | Ives |
| 2,143,762 A | 1/1939 | Carstaff |
| 2,144,649 A | 1/1939 | Eggert et al. |
| 2,191,038 A | 2/1940 | Capstaff |
| 2,252,006 A | 8/1941 | Holst et al. |
| 2,304,988 A | 12/1942 | Yule |
| 2,316,644 A | 4/1943 | Yule |
| 2,407,211 A | 9/1946 | Yule |
| 2,455,849 A | 12/1948 | Yule |
| 2,691,586 A | 10/1954 | Yule et al. |
| 2,992,103 A | 7/1961 | Land et al. |

(List continued on next page.)

FOREIGN PATENT DOCUMENTS

JP 2001-147466 5/2001

OTHER PUBLICATIONS

Edward M. Crane and C. H. Evans, "Devices for Making Sensitometric Exposures on Embossed Kinescope Recording Film" Jan. 1958, pps. 13–16, Journals of the SMPTE vol. 67.

J.S. Courtney–Pratt, "Lenticular Plate Multiple Picture Shadowgraph Recording", Sep. 1961, pps. 710–715, Journal of the SMPTE, vol. 70.

C.H.Evans and R.B. Smith, "Color Kinescope Recording on Embossed Film" Jul., 1956, pps. 365–372, Journal of the SMPTE, vol. 65.

Rudolf Kingslake, "The Optics of the Lenticular Color–Film Process", Jan. 1958, pps. 8–13, Journal of the SMPTE, vol. 67.

Furukawa, et al., "A ⅓–inch 380K Pixel (Effective) IT–CCD Image Sensor", Jun. 5, 1992, pps. 595–600, IEEE, vol. 38, No. 3.

Deguchi et al., "Microlens Design Using Simulation Program For CCD Image Sensor", Jun. 5, 1992, pps. 583–589, IEEE, vol. 38, No. 3, Aug. 1992.

*Primary Examiner*—W. B. Perkey
(74) *Attorney, Agent, or Firm*—Roland R. Schindler, II

(57) ABSTRACT

A camera is provided. The camera has a primary lens adapted to focus light from a scene and an array of micro-lenses with each micro-lens having a light receiving surface to receive light from the primary lens and a light focusing surface confronting a photosensitive element. The light focusing surface is adapted to concentrate the received light onto the photosensitive element. A spacer positions the photosensitive element separate from the light focusing surfaces of the micro-lenses and a shutter assembly controllably passes light from the scene to the array of micro-lenses.

20 Claims, 10 Drawing Sheets

U.S. PATENT DOCUMENTS

| | | | | |
|---|---|---|---|---|
| 3,267,826 A | * | 8/1966 | Browning | 396/322 |
| 3,413,117 A | | 11/1968 | Gaynor | |
| 3,506,350 A | | 4/1970 | Denner | |
| 3,731,606 A | * | 5/1973 | Geoffray | 396/333 X |
| 3,905,701 A | | 9/1975 | David | |
| 3,954,334 A | | 5/1976 | Bestenreiner et al. | |
| 3,973,953 A | | 8/1976 | Montgomery | |
| 3,973,954 A | | 8/1976 | Bean | |
| 3,973,957 A | | 8/1976 | Montgomery | |
| 3,973,958 A | | 8/1976 | Bean | |
| 4,040,830 A | | 8/1977 | Rogers | |
| 4,166,684 A | * | 9/1979 | Law | 396/440 |
| 4,175,844 A | * | 11/1979 | Glaser-Inbari | 396/322 |
| 4,198,147 A | * | 4/1980 | Alasia | 396/330 |
| 4,272,186 A | | 6/1981 | Plummer | |
| 4,458,002 A | | 7/1984 | Janssens et al. | |
| 4,483,916 A | | 11/1984 | Thiers | |
| 5,464,128 A | | 11/1995 | Keller | |
| 5,477,291 A | | 12/1995 | Mikami et al. | |
| 5,649,250 A | | 7/1997 | Sasaki | |
| 5,744,291 A | | 4/1998 | Ip | |
| 5,797,052 A | * | 8/1998 | Day | 396/330 |

* cited by examiner

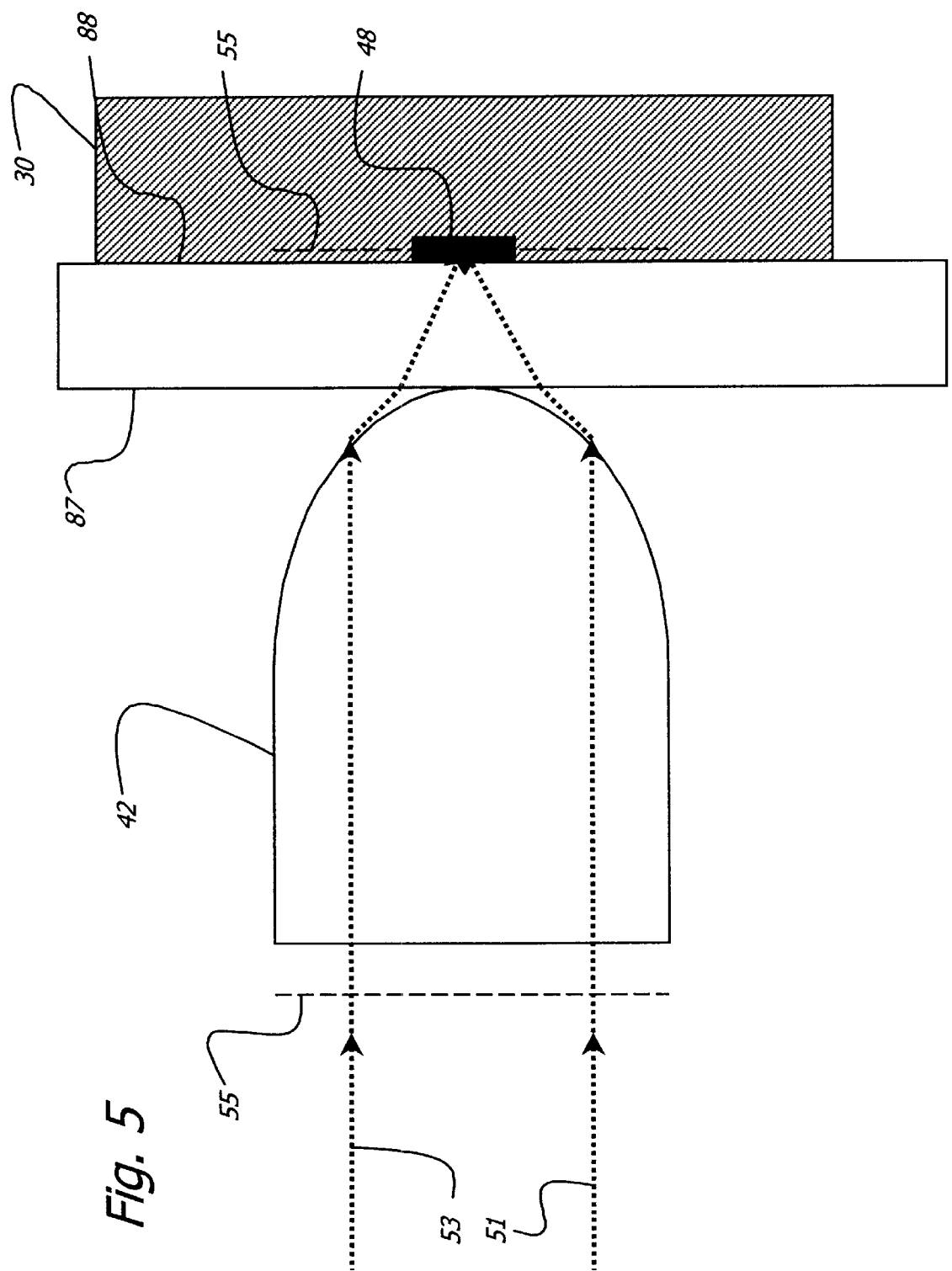

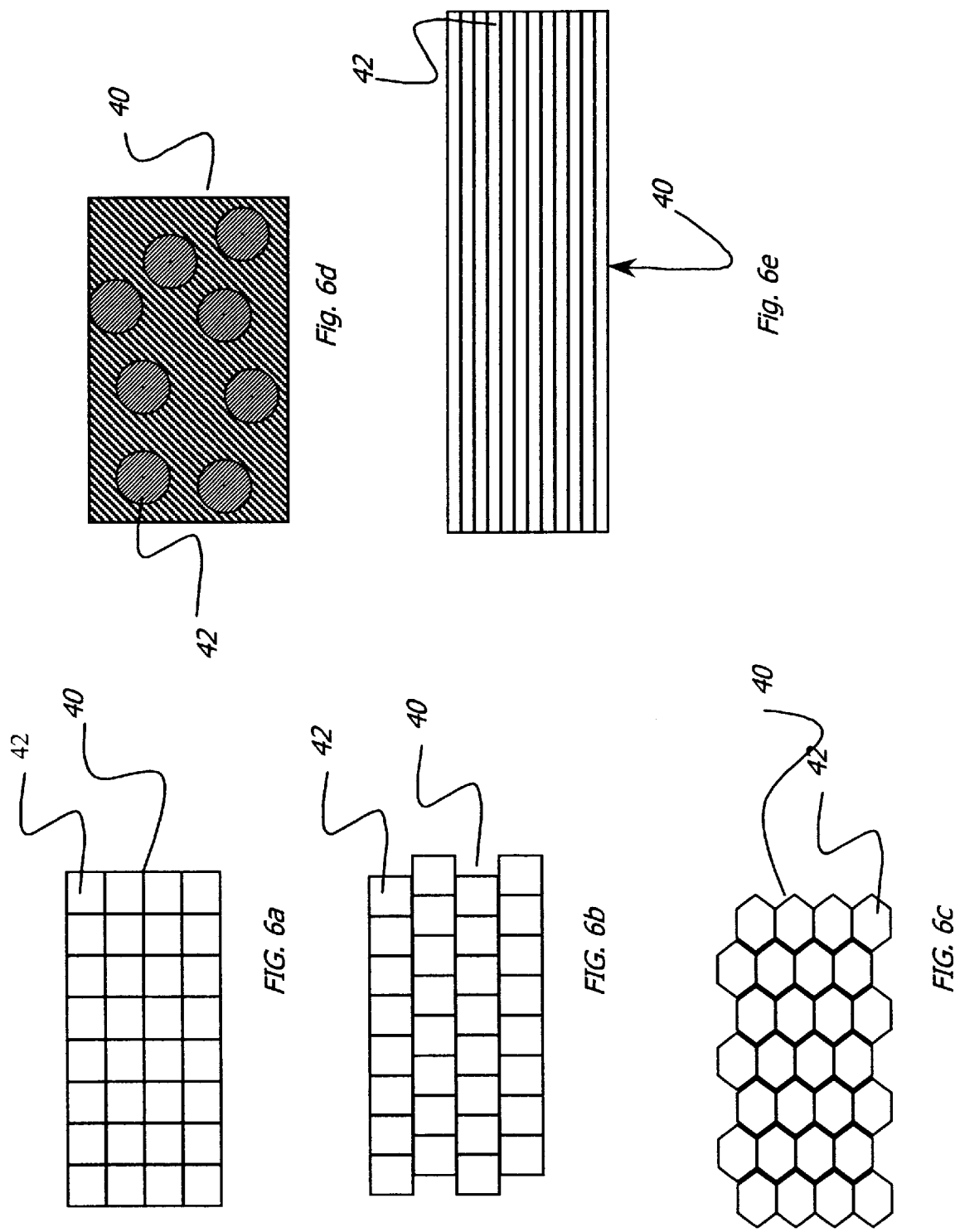

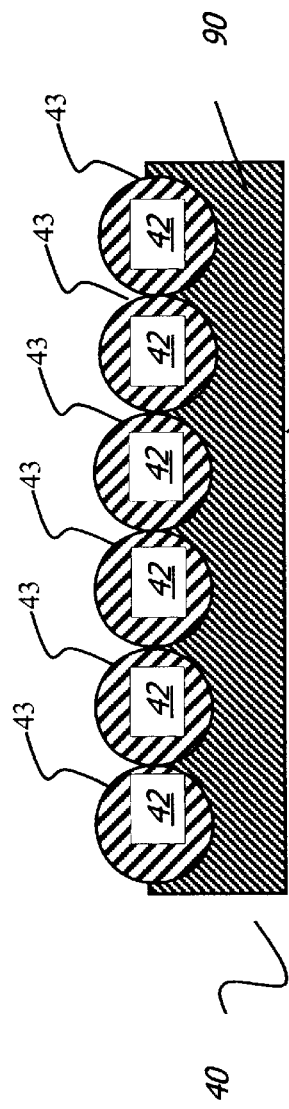
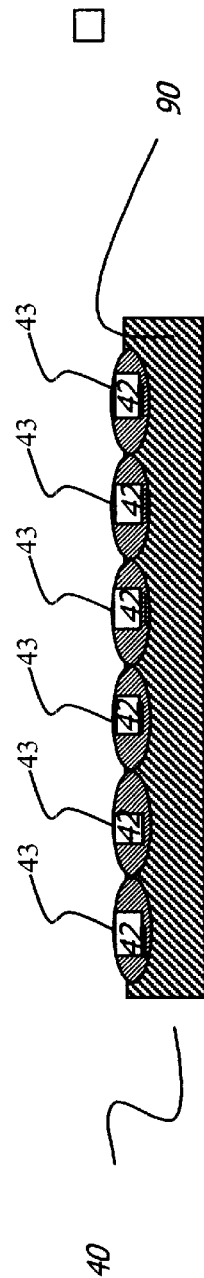
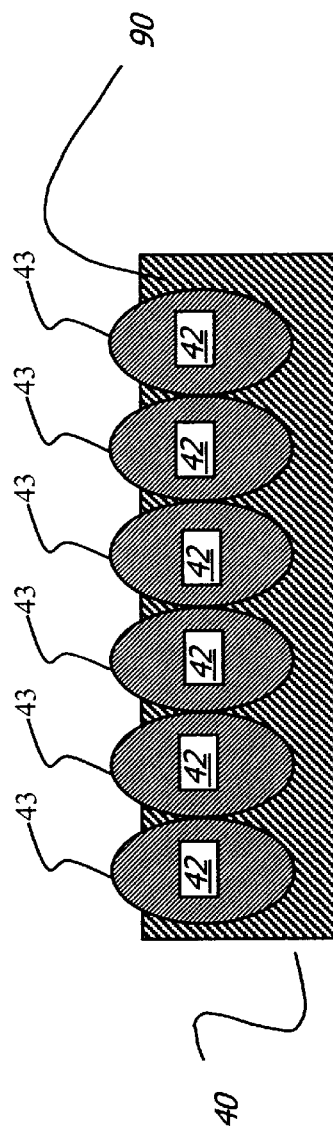
Fig. 8a
Fig. 8b
Fig. 8c

IMAGING USING SILVER HALIDE FILMS WITH INVERSE MOUNTED MICRO-LENS AND SPACER

CROSS REFERENCE TO RELATED APPLICATIONS

This application is related to a group of five previously co-filed and commonly assigned U.S. Patent Applications, namely U.S. patent application Ser. No. 10/170,607, entitled CAMERA SPEED COLOR FILM WITH BASE SIDE MICRO-LENSES; in the names of Lyn Irving and Richard Szajewski; U.S. patent application Ser. No. 10/171,012, entitled LENTICULAR IMAGING WITH INCORPORATED BEADS, in the names of Krishnan Chari, Lyn Irving and Richard Szajewski; U.S. patent application Ser. No. 10/167,746, entitled CAMERA SPEED COLOR FILM WITH EMULSION SIDE MICRO-LENSES, in the names of Richard Szajewski and Lyn Irving; U.S. patent application Ser. No. 10/167,794, entitled IMAGING USING SILVER HALIDE FILMS WITH MICRO-LENS CAPTURE, AND OPTICAL RECONSTRUCTION in the names of Lyn Irving and Richard Szajewski, the contents of which are incorporated herein by reference, and U.S. patent application Ser. No. 10/170,148, entitled IMAGING USING SILVER HALIDE FILMS WITH MICRO-LENS CAPTURE, SCANNING AND DIGITAL RECONSTRUCTION in the names of Richard Szajewski and Lyn Irving, the contents of which are incorporated herein by reference.

FIELD OF THE INVENTION

This invention is related to micro-lens aided silver halide photography.

BACKGROUND OF THE INVENTION

In conventional photography, it is well known to record images by controllably exposing a photosensitive element to light from a scene. Typically, such a photosensitive element comprises one or more photosensitive layers supported by a flexible substrate such as film and/or a non-flexible substrate such as a glass plate. The photosensitive layers, which can have one or more light sensitive silver halide emulsions along with product appropriate imaging chemistry, react to the energy provided by the light from the scene. The extent of this reaction is a function of the amount of light received per unit area of the element during exposure. The extent of this reaction is greater in areas of the element that are exposed to more light during an exposure than in areas that are exposed to less light. Thus, when light from the scene is focused onto a photosensitive element, differences in the levels of light from the scene are captured as differences in the extent of the reaction in the layers. After a development step, the differences in the extent of the reaction in the layers appear as picture regions having different densities. These densities form an image of the original scene luminance distribution.

It is characteristic of silver halide emulsions to have a non-linear response when exposed to ambient light from a scene. In this regard a photosensitive element has a lower response threshold that defines the minimum exposure at which the incorporated emulsions and associated chemistry begins to react so that different levels of exposure enable the formation of different densities. This lower threshold ultimately relates to the quantum efficiency of individual silver halide emulsion grains. Typically, all portions of a photosensitive element that are exposed to light at a level below the lower response threshold have a common appearance when the photosensitive element is developed.

Further, a photosensitive element also has an upper response threshold that defines the exposure level beyond which the emulsion and associated chemistries no longer enable the formation of different densities. Typically, all portions of an element that are exposed at a level above the upper response threshold will again have a common appearance after the photosensitive element is developed.

Thus photosensitive elements that use silver halide emulsions can be said to have both a lower response threshold and an upper response threshold which bracket a useful range of exposures wherein the photosensitive element is capable of reacting to differences in exposure levels by recording a contrast pattern with contrast differences that are differentiable. The exposure levels associated with these lower and upper thresholds define the exposure latitude of the photosensitive element. To optimize the appearance of an image, therefore, it is typically useful to arrange the exposure so that the range of exposure levels encountered by the photosensitive element during exposure is within the latitude or useful range of the photosensitive element.

Many consumer and professional photographers prefer to use photosensitive elements, camera systems, and photography methods that permit image capture over a wide range of photographic conditions. One approach to meeting this objective is to provide photosensitive elements with extremely wide latitude. However, extremely wide latitude photosensitive elements are fundamentally limited by the nature of the response of the individually incorporated silver halide grains to light. Accordingly, it is common to provide camera systems and photography methods that work to effectively extend the lower response limit and upper response limit of a photosensitive element by modifying the luminance characteristics of the scene. For example, it is known to effectively extend the lower response limit of the photosensitive element by providing supplemental illumination to dark scenes.

It is also known to increase the quantity of the light acting on a photosensitive element without providing supplemental illumination by using a taking lens system designed to pass a substantial amount of the available light from the scene to the photosensitive element during an exposure. However, lenses that pass a substantial amount of light also inherently reduce the depth-of field of the associated camera system. This solution is thus not universally suitable for pictorial imaging with fixed focus cameras since scenes may not then be properly focused. This solution is also not preferred in variable focused cameras as such lens systems can be expensive, and difficult to design, install and maintain.

There is a direct relationship between the duration of exposure and quantity of light from the scene that strikes the photosensitive element during an exposure. Accordingly, another way known in the art for increasing the amount of light acting on a photosensitive element during an exposure is to increase the duration of the exposure using the expedient of a longer open shutter. This, however, degrades upper exposure limits. Further, increased shutter open time can cause the shutter to remain open for a period that is long enough to permit the composition of a scene to evolve. This results in a blurred image. Accordingly, there is a desire to limit shutter open time.

Thus, what is also needed is a less complex and less costly camera system and photography method allowing the capture of images using conventional shutter open times and particularly with cameras having a fixed shutter time.

Another way to increase the quantity of the light acting on a photosensitive element during an exposure is to use a conventional taking lens system to collect light from a scene and to project this light from the scene onto an array of micro-lenses such as an array of linear lenticular lenses that are located proximate to the photosensitive element. An example of this is shown in U.S. Pat. No. 1,838,173 filed by Chretien on Jan. 9, 1928. Each micro-lens concentrates a portion of the light from the scene onto associated areas of a photosensitive element. By concentrating light in this manner, the amount of light incident on each concentrated exposure area of the photosensitive element is increased to a level that is above the lower response threshold of the film. This permits an image to be formed by contrast patterns in the densities of the concentrated exposure areas.

Images formed in this manner are segmented: the concentrated exposure areas form a concentrated image of the scene and remaining portions of the photosensitive element form a pattern of unexposed artifacts intermingled with the concentrated image. In conventionally rendered prints of such images this pattern has an unpleasing low contrast and a half-tone look much like newspaper print.

However, a recognizable image can be obtained from such segmented images by projection under quite specific conditions. These conditions occur precisely when the spatial relationship between the effective camera aperture, the micro-lens array and the light sensitive element established at exposure in the camera is reproduced in the projector. This system can be cumbersome because a functional real image is produced at a position and magnification dictated by the original scene to camera lens arrangement. If a projection lens identical to the camera taking lens is positioned so as to mimic the camera lens to image relationship that existed at image taking, the reconstructed image will appear at the position of the original object with the size of the original object. Other lens and spatial relationship combinations result in incomplete image reconstruction and the formation of the dots and lines reminiscent of newspaper print. Thus, the micro-lens or lenticular assisted low light photography of the prior art is ill suited for the production of prints or for use in high quality markets such as those represented by consumers and professional photographers.

Micro-lens arrays, and in particular, lenticular arrays have found other applications in photography. For example, in the early days of color photography, linear lenticular image capture was used in combination with color filters as means for splitting the color spectrum to allow for color photography using black and white silver halide imaging systems. This technology was commercially employed in early color motion picture capture and projection systems as is described in commonly assigned U.S. Pat. No. 2,191,038. In the 1950s it was proposed to use lenticular screens to help capture color images using black and white photosensitive element in instant photography U.S. Pat. No. 2,922,103. In the 1970s, it was proposed to expose a photosensitive element through a moving lenticular screen U.S. Pat. No. 3,954,334 to achieve gradual tinting. Also in the 1970's, U.S. Pat. No. , 3,973,953 filed by Montgomery describes an arrangement of micro-lenses and a photosensitive material in which the photosensitive material is kept out of focus to achieve increased photosensitive latitude at the cost of forming imperfect images. In the 1980's, U.S. Pat. No. 4,272,186 filed by Plummer describes a related arrangement of micro-lenses and a photosensitive material further comprising a screen to control the exposure contrast of the system. Here, a separation of at least 2.5 mm is required between the surface of the photosensitive material and the surface of the micro-lens array. This long focal length practically limits the range of useful microlens sizes and f-numbers to those compatible with direct view prints but not compatible with enlargements as are required from modem camera films suitable for employed in hand-held cameras. By minimizing the size of the unexposed areas, the line pattern became almost invisible and was therefore less objectionable.

Finally, in the 1990's linear lenticular-ridged supports having three-color layers and an antihalation layer were employed for 3-D image presentation materials. These linear lenticular arrays were used to form interleaved print images from multiple views of a scene captured in multiple lens cameras. The interleaved images providing a three dimensional appearance. Examples of this technique are disclosed in U.S. Pat No. 5,464,128 filed by Lo et al. and in U.S. Pat. No. 5,744,291 filed by Ip. It is recognized that these disclosures relate to methods, elements and apparatus adapted to the formation of 3-D images from capture of multiple scene perspectives that are suitable for direct viewing. They fail to enable photography with shutter times suitable for use in hand-held cameras.

U.S. Pat. No. 5,649,250, filed by Sasaki, U.S. Pat. No. 5,477,291 filed by Mikami et al. and Japanese Patent Publication 2001-147,466 filed by Hiroake et al. describe the replacement of single lenses in cameras by multiple instances (eight to sixteen) of smaller lenses to allow either simultaneous capture of multiple instances of the same image on a single frame of film stock or sequential capture of distinct images to enable, for example analysis of such athletic motion as golf swings.

Thus, while micro-lens assisted photography has found a variety of uses, it has yet to fulfill the original promise of effectively extending the lower response threshold of a photosensitive element to permit the production of commercially acceptable prints from images captured at low scene brightness levels. What is needed, therefore, is a method and apparatus for capturing lenticular images on a photosensitive element and using the captured photosensitive element image to form a commercially acceptable print or other output.

It can also occur that it is useful to capture images under imaging conditions that are above the upper response threshold of the photosensitive element. Such conditions can occur with bright scenes that are to be captured under daylight, snow pack and beach situations. Typically, cameras use aperture control, shutter timing control and filtering systems to reduce the intensity of light from the scene so that the light that confronts the photosensitive element has an intensity that is within the upper limit response of the photosensitive element. However, these systems can add significant complexity and cost to the design of the camera. Further, the expedient of using a lens with a more open aperture to improve the lower threshold limit as discussed earlier simultaneously passes more light and degrades the exposure at the upper response threshold. Thus, what is also needed is a simple, less costly, camera system and photography method for capturing images over a range of exposure levels including exposure levels that are greater than the upper response limit of the photosensitive element.

Novel methods and apparatus for employing micro-lenses to improve the sensitivity and scene capture latitude of silver halide films along with methods to form useful images from micro-lens mediated scene capture have been disclosed in commonly assigned U.S. patent application Ser. No. 10/167, 794 entitled "IMAGING USING SILVER HALIDE FILMS WITH MICRO-LENS CAPTURE AND OPTICAL RECONSTRUCTION," filed on Jun. 12, 2002, by Irving and Szajewski, and U.S. patent application Ser. No. 10/170, 148 entitled "IMAGING USING SILVER HALIDE FILMS WITH MICRO-LENS CAPTURE, SCANNING AND DIGITAL RECONSTRUCTION," filed on Jun. 12, 2002, by Szajewski and Irving. These disclosures describe arrays of micro-lenses formed into a film base, on a film surface or supplied as free-standing micro-lens arrays which accept light from a primary camera lens and converge the accepted light through their optically transmissive material at a focal plane sufficiently coincident with the light sensitive areas of a silver halide film to enable improved imaging.

In the case of micro-lenses formed into an optically transparent material, the focal length is practically set by the thickness of the material, and this set focal length along with the refractive index of the constituent optically transmissive material defines the required radius of curvature of the individual micro-lenses. This defined radius of curvature in turn sets an upper limit on the aperture of the individual micro-lenses and the effective f-number or converging power of the micro-lenses, as well as the number of micro-lenses that can be packed per unit area or the micro-lens pitch. Free standing arrays of micro-lenses having the very fine pitch used in high resolution imaging require short focal lengths and therefore are typically made from very thin lenticular materials. Such thin lenticular materials can be difficult to manufacture reproducibly and can be difficult to mount with sufficient flatness and rigidity at the focal plane of a camera. Further, the short focal distances of micro-lenses having the very fine pitch used in high resolution imaging requires a flatness and rigidity of the photosensitive element that can be difficult to achieve.

SUMMARY OF THE INVENTION

In one aspect of the present invention, a camera is provided. The camera has a primary lens adapted to focus light from a scene and an array of micro-lenses with each micro-lens having a light receiving surface to receive light from the primary lens and a light focusing surface confronting a photosensitive element. The light focusing surface is adapted to concentrate the received light onto the photosensitive element. A spacer positions the photosensitive element separate from the light focusing surfaces. A shutter assembly controllably passes light from the scene to the array of micro-lenses.

In another aspect of the present invention, what is provided is a camera for recording images, the camera having a primary lens adapted to focus light from a scene to form an image of the scene at an imaging plane, and a shutter assembly for controllably passing light from the scene to the imaging plane. An array of micro-lenses is provided with each micro-lens having a receiving surface positioned at the imaging plane to receive light from the primary lens and with each micro-lens having a focusing surface adapted to focus received light to form an image between a near focus distance and a far focus distance. A gate positions the photosensitive element between the near and far focus distances, at a distance between 5 and 1500 micro-meters from the focusing surfaces of the micro-lenses.

In still another aspect of the present invention, a camera for recording images on a photosensitive element having an emulsion for recording an image when exposed to light within a predefined range of exposures. The camera has a camera body with an aperture having a taking lens system for focusing light from a scene. A gate is adapted to position the photosensitive element to confront the aperture. An array of micro-lenses is disposed between said aperture and said gate with said array adapted to receive light from the primary lens system and to pass the light through a light focusing surface confronting the photosensitive element wherein the light focusing surface is adapted to fracture light from the scene into a first fraction and a second fraction. The first fraction of light from the scene is concentrated to form a first image on a first portion of the photosensitive element when light from the scene is within a first range. The second fraction of light from the scene passes onto the photosensitive element to form a second image on a second portion of the photosensitive element. When light from the scene is within a second range, a shutter controllably permits light from the scene to expose the photosensitive element for a predefined period of time, said predefined period of time being sufficient to form an image on said second portion of the photosensitive element when light from the scene is within the second range.

BRIEF DESCRIPTION OF THE DRAWINGS

FIG. 5 illustrates with ray tracing light concentration of a single instance of a micro-lens with spacer FIGS. 6a–6e illustrates embodiments of an array of micro-lenses useful in practicing the present invention.

FIGS. 8a–8c illustrate of arrays of micro-lenses, spherical and aspherical lenses.

DETAILED DESCRIPTION OF THE INVENTION

Figure 1:
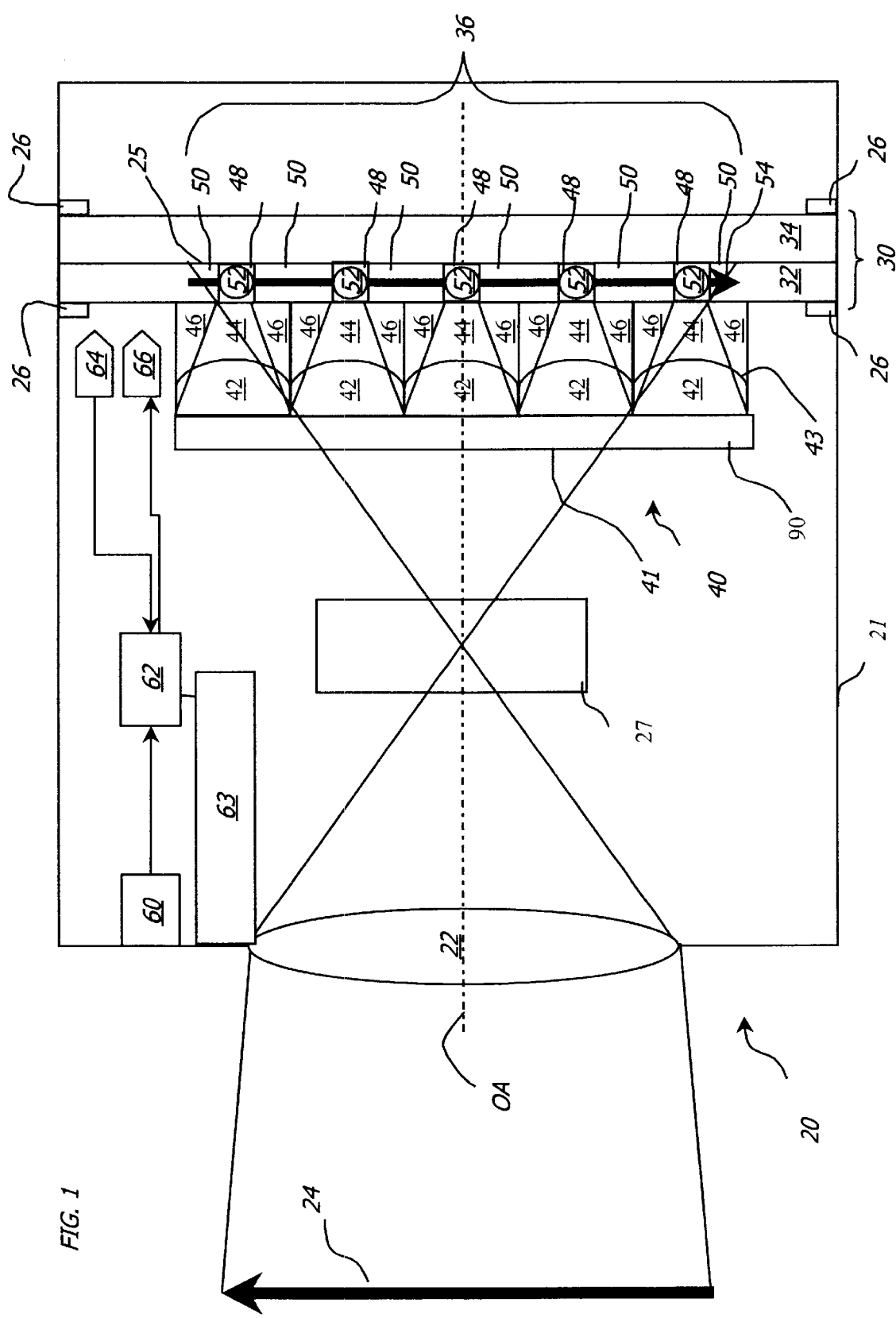
FIG. 1 shows a schematic view of one embodiment of a camera according to the invention.

FIG. 1 shows a diagram useful in describing the operation of one embodiment of a camera 20 for forming an image on a photosensitive element 30 comprising a photosensitive layer 32 and a substrate 34. In the embodiment of FIG. 1, camera 20 includes a body 21 having a taking lens system 22 comprising an aperture 23 to admit light from a scene 24 into body 21. The taking lens system 22 directs light from a scene 24 along optical axis 45 toward a gate 26 that positions photosensitive element 30 at a defined distance from taking lens system 22 during exposure. Gate 26 is generally configured as is known in the art with rails, stops and such arranged to form an exposure aperture (not shown) and to position the photosensitive element 30 appropriately for exposure. Other embodiments of gate 26 will also be described in greater detail below. Preferably, the depth of focus of the taking lens system 22 is such that an image 25 of scene 24 is formed on an imaging area 36 of the photosensitive layer 32 with image of scene 25 having a consistent focus across the imaging area 36.

Interposed between taking lens system 22 and photosensitive element 30 is a micro-lens array 40 having a plurality of micro-lenses 42. Each of the micro-lenses 42 in micro-lens array 40 has a light receiving surface 41 that receives a portion of the light passing from the taking lens system 22 and a light focusing surface 43 that fractures this light into a concentrated fraction 44 and a residual fraction 46. In practice, the micro-lens array 40 is positioned in camera 20 generally parallel to and between taking lens system 22 and photosensitive element 30 with each micro-lens light receiving surface 41 facing taking lens system 22 and each micro-lens light focusing surface 43 facing the photosensitive element 30. The micro-lens array 40 is generally transparent and of sufficient optical quality to form the desired images. The surfaces of the micro-lens array 40 will generally have a surface roughness of between about 20 and 200 angstroms and preferably a surface roughness of between about 40 and 100 angstroms. The overall thickness of the micro-lenses 42 and their associated support structure 90 will be adequate to enforce the needed rigidity to enable adequate photographic performance. Typically, with optical quality glasses and plastics, this thickness is between 0.05 and 20 mm and preferably between 0.1 and 10 mm. Accordingly, embossed portions of known photographic supports can be employed as the microlens array 40 as can extruded plastic portions, re-melt micro-lens structures and such. Each of the concentrated fractions 44 are concentrated onto associated concentrated image areas 48 of photosensitive element 30 and each residual fraction 46 passes to an associated residual image area 50 of photosensitive element 30. The effect of fracturing is shown conceptually in FIG. 1 and will now be described with reference to FIGS. 1 and 2a, 2b and 2c. The camera 20 further comprises a shutter system 27. Shutter system 27 controllably permits light from the scene to expose photosensitive element 30 for a predefined period of time.

Figure 2A:
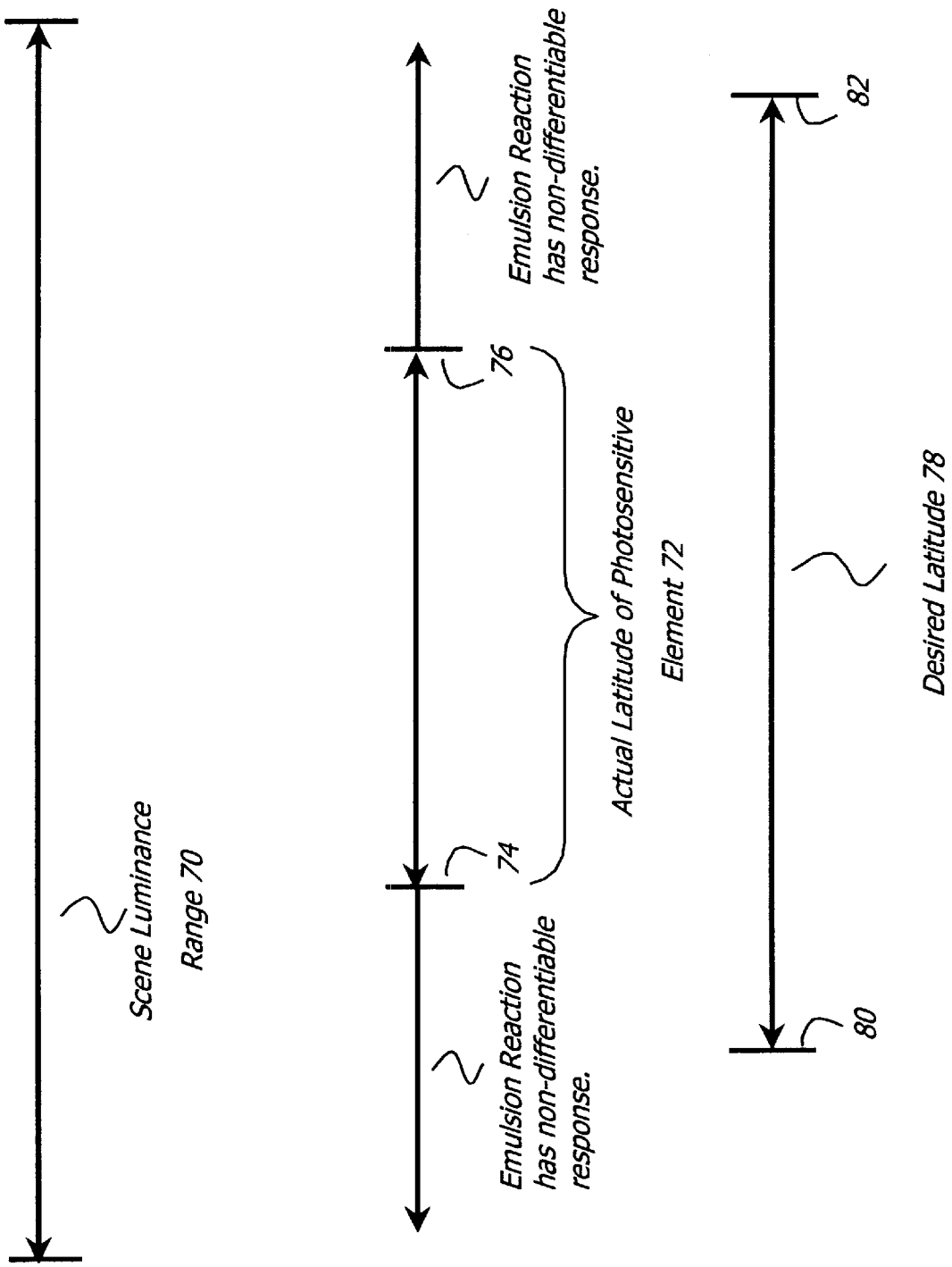
FIG. 2a is a diagram useful in describing the relationship between scene exposure actual latitude and effective latitude.

As is shown in FIG. 2a, light from a photographic scene extends, over a wide range of scene luminances. In the case of available light photography, these are the luminances that are visually observable by humans. This range is indicated in FIG. 2a as scene luminance range 70. However, photosensitive element 30 has an actual latitude 72 within which the photosensitive element 30 can capture differences in scene illumination and record a contrast image of the scene. Because of the inherent limitations of chemical image capture technology and the specific non-linear response of the photosensitive element 30 to illumination from the scene, the actual latitude 72 of photosensitive element 30 is defined by a lower response threshold 74 and an upper response threshold 76. Photosensitive element 30 does not differentiably react to scene illumination differences when photosensitive element 30 is exposed to quantities of light that are lower than the lower response threshold 74. As noted above, this is because the energy made available by such limited quantities of light is not sufficient to cause the emulsion and associated chemistries to react to form a differentiable exposure record. Accordingly, all portions of the photosensitive element 30 that are exposed to such quantities of light have a generally light appearance when photosensitive element 30 is photoprocessed.

Similarly, photosensitive element 30 does not differentiably react to scene illumination differences when photosensitive element 30 is exposed to quantities of light that are higher than the upper response threshold 76. As noted in greater detail above, this is because the amount of light received by the photosensitive element 30 above upper response threshold 76 is sufficient to drive the chemical reaction of the emulsions and associated chemistries a point wherein photosensitive element 30 no longer has a meaningful additional density response to additional light energy. Because of this, all portions of photosensitive element 30 that are exposed to such quantities of light have a generally dark appearance when photosensitive element 30 is photoprocessed.

It is appreciated that the terms light and dark are appropriate for negative working photosensitive materials such as print films intended for use with negative working papers or for scanning. With positive working photosensitive materials such as reversal slide films and direct print films, the recited areas would be respectively dark and light in characteristic.

Any known photosensitive material formulation can be used to prepare a photosensitive element 30 useful in the practice of the invention. Elements having excellent light sensitivity are best employed in the practice of this invention. The elements should have a sensitivity of at least about ISO 25, preferably have a sensitivity of at least about ISO 100, and more preferably have a sensitivity of at least about ISO 400. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number pH 2.27-1981 (ISO (ASA Speed)) and relates specifically the average of exposure levels required to produce a density of 0.15 above the minimum density in each of the green light sensitive and least sensitive color recording unit of a color film. This definition conforms to the International Standards Organization (ISO) film speed rating. For the purposes of this application, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

While standard photographic elements can be employed in this invention, the elements most useful in this invention are designed for capturing an image in machine readable form rather than in a form suitable for direct viewing. In the capture element, speed (the sensitivity of the element to low light conditions) is usually critical to obtaining sufficient image in such elements. Accordingly, the elements, after micro-lens speed enhancement will typically exhibit an equivalent ISO speed of 800 or greater, preferable an equivalent ISO speed of 1600 or greater and most preferably an equivalent ISO speed of 3200 or greater. The elements will have a latitude of at least 3.0 log E, and preferably a latitude of 4.0 log E, and more preferable a latitude of 5.0 log E or even higher in each color record. Such a high useful latitude dictates that the gamma of each color record (i.e. the slope of the Density vs. log E after photoprocessing) be less than 0.70, preferably less than 0.60, more preferably less than 0.50 and most preferably less than 0.45. Further, the color interactions between or interimage effects are preferably minimized. This minimization of interimage effect can be achieved by minimizing the quantity of masking couplers and DIR compounds. The interimage effect can be quantified as the ratio of the gamma of a particular color record after a color separation exposure and photoprocessing divided by the gamma of the same color record after a white light exposure. The gamma ratio of each color record is preferably between 0.8 and 1.2, more preferably between 0.9 and 1.1 and most preferably between 0.95 and 1.05. Further details of the construction, characteristics quantification of the performance of such scan enabled light sensitive elements and are disclosed in Sowinski et al. U.S. Pat Nos. 6,021,277 and 6,190,847, the disclosures of which are incorporated by reference.

Figure 2B:
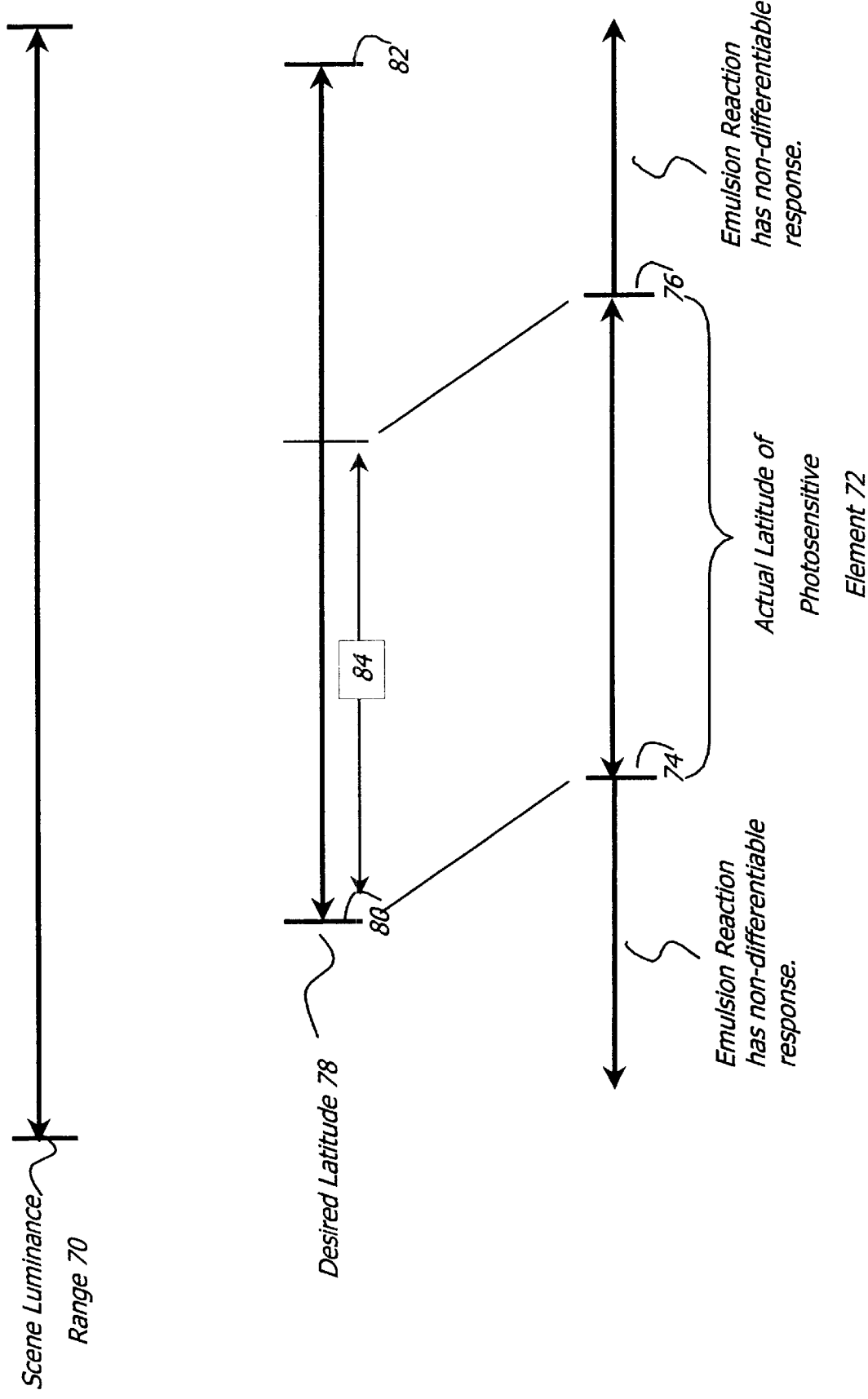
FIG. 2b is a diagram useful in describing the effect of concentrated light on a photosensitive element.

As is also shown in FIG. 2a, it is desirable that camera 20 and photosensitive element 30 should record scene information at a desired lower response threshold of desired latitude 80 that is lower than the response threshold 74 of photosensitive element 30. In accordance with the principles of the present invention, photography in this range of illumination is made possible by concentrating light from the scene. In this regard, each of the micro-lenses 42 in micro-lens array 40, fractures light from the scene into at least two portions. As is shown in FIG. 1, a concentrated fraction 44 of light from scene 24 is concentrated so that a greater amount of light per unit area falls upon each of the concentrated image areas 48 of photosensitive element 30 during an exposure than would fall upon concentrated image areas 48 in the absence of the micro-lens array 40 of micro-lenses 42. As is shown in FIG. 2b, this increase in the amount of light incident upon concentrated image areas 48 has the effect of shifting a first exposure range 84 of scene exposure levels so that the entire first exposure range 84 is within the actual latitude of photosensitive element 72. This shift allows a pattern of concentrated image elements 52 to form a concentrated image in the concentrated image areas 48 of photosensitive element 30.

Incidentally, some of the light incident on micro-lenses 42, for example, light that is poorly focused by micro-lenses 42 or light that passes between distinct ones of micro-lenses 42 is not focused on concentrated image areas 48. Instead, this residual fraction 46 of the light passes to photosensitive element 30 and is incident on residual image area 50 enabling formation of a residual image 54. Residual image 54 can further be formed by designed or adventitious light scatter and reflection in photosensitive element 30 as well as by light flare from reflecting surfaces in the structure of camera 20. This residual fraction 46 is less than the amount of light that would be incident on photosensitive element 30 in the event that micro-lens array 40 of micro-lenses 42 was not interposed between the scene 24 and the photosensitive element 30 during the same exposure. Thus, micro-lenses 42 effectively filter light from the scene that is incident on residual image area 50 so that a greater quantity of light must be available during the exposure in order for a residual image 54 to be formed on photosensitive element 30. Accordingly, the predefined period of time that shutter system 27 permits for exposure of photosensitive element 30 is sufficient to form an image on the residual image area 50 of the photosensitive element when light from the scene is within a second range.

Figure 2C:
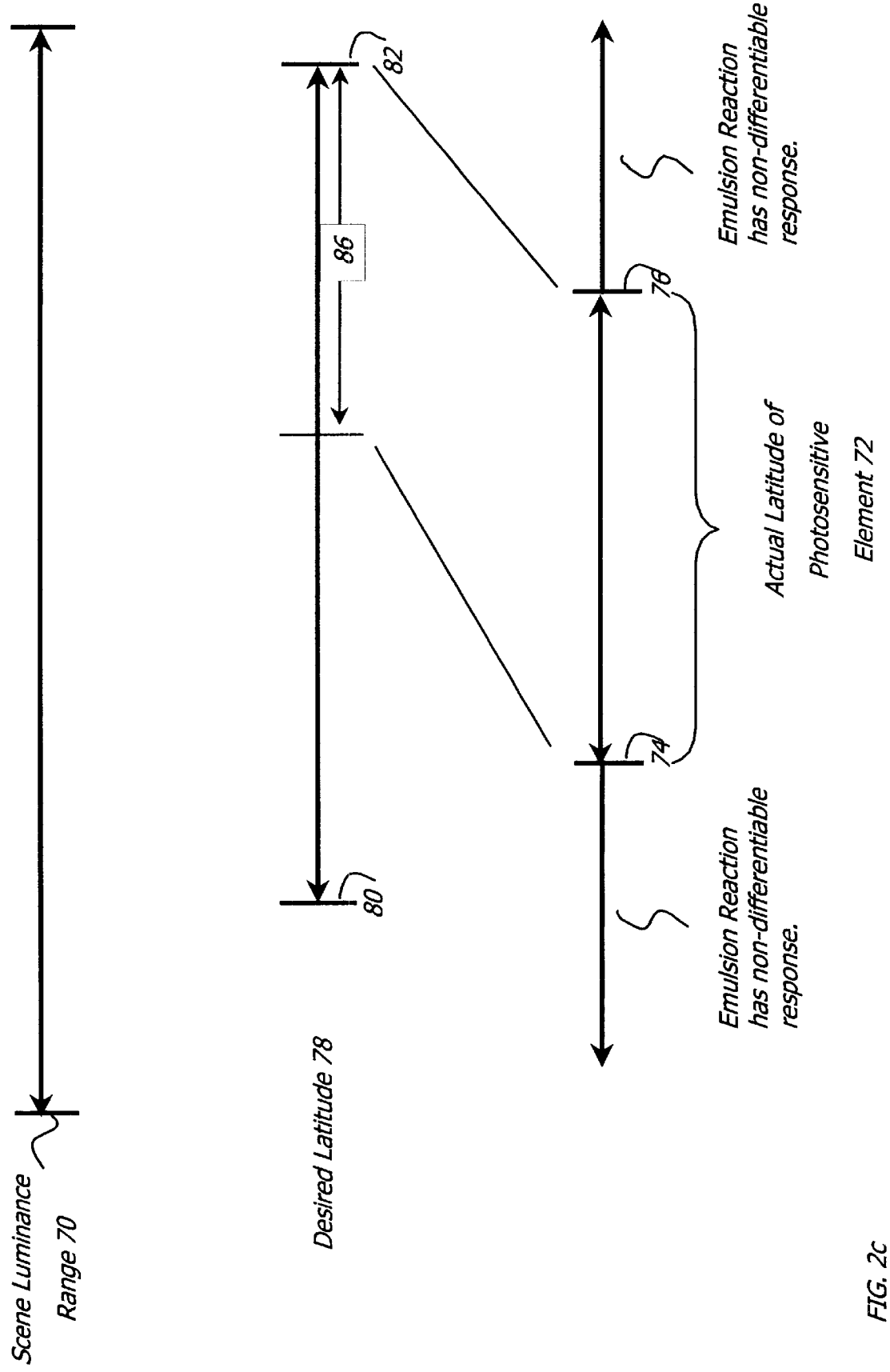
FIG. 2c is a diagram useful in describing the effect of residual light on the photosensitive element.

Accordingly, as is shown in FIG. 2c, when the micro-lenses 42 of micro-lens array 40 are exposed to light within a second exposure range 86, a second exposure suitable for producing an image over the range indicated by second exposure range 86 is formed on photosensitive element 30 in the residual image area 50. In this way, photosensitive element 30 can be used to record differentiable images at exposure levels that are above the upper response threshold 76 of photosensitive element 30 but below desired upper response threshold of desired latitude 82.

A region of overlap can be defined between the first exposure range 84 and second exposure range 86. Where it is desired to greatly increase system latitude desired for photographic element 78, this region of overlap can be contracted. In a preferred embodiment, the ability to capture image information from either of the concentrated image elements 52 or residual image elements 54 over a continuous desired latitude desired for photographic element 78 is ensured by defining a substantial range of exposures wherein first exposure range 84 and second exposure range 86 overlap. Alternatively, it may be preferred to provide a camera 20 wherein there is little overlap or even substantial separation between first exposure range 84 and second exposure range 86. Camera 20 having such a substantial separation would effectively operate to capture different images under very different imaging conditions such as daylight and interior light.

It will be appreciated that when an exposure level is in the second exposure range 86, concentrated image elements 52 are formed on element 30. The concentrated image elements 52 formed during exposure in the second exposure range 86 can contain useful imaging information where the first exposure range 84 and second exposure range 86 at least partially overlap. However, where the exposure is above the first exposure range 84 then the concentrated image elements 52 will appear as over exposed artifacts in residual image 54 formed in the residual image area 50.

It will be further appreciated that while this discussion has been framed in terms of a specific embodiment directed towards silver halide photography intended for capturing human visible scenes the invention can be readily applied to capture extended scene luminance ranges and spectral regions invisible to humans and the photosensitive element 20 can use any light sensitive material known to the art that has the requisite imaging characteristics. The effective increase in sensitivity enabled can be at least 0.15 log E. In certain embodiments, the effective increase in sensitivity can be between at least 0.3 log E and 0.6 log E. In another embodiment, the effective increase in sensitivity is at least 0.9 log E.

Figure 3:
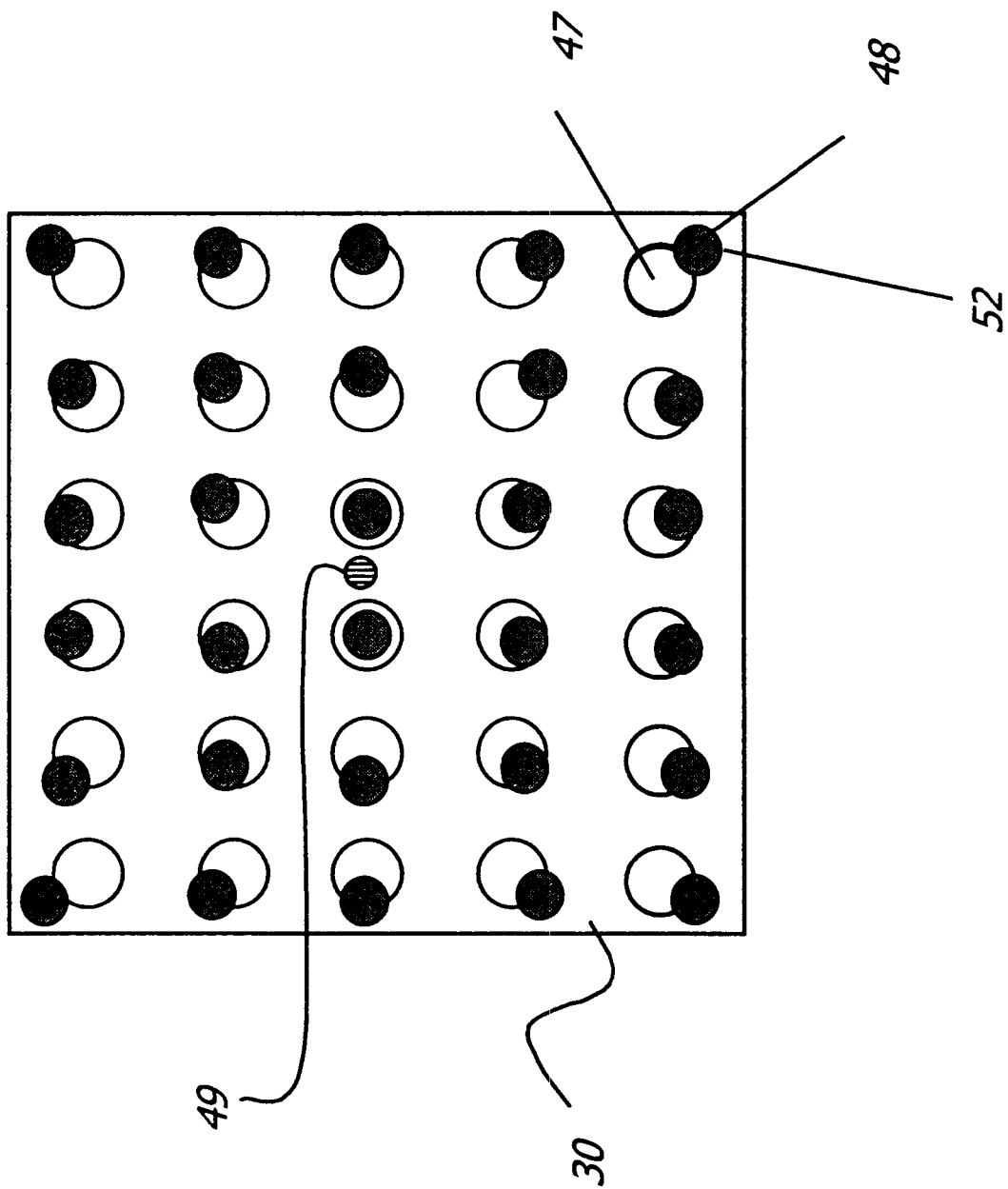
FIG. 3 shows a pattern of dots formed behind a square packed micro-lens array.

FIG. 3 shows an exposure pattern formed on photosensitive element 30 during imagewise exposure through a regular square array of spherical microlenses 42. Also shown in FIG. 3 is the intersection 49 of optical axis 45 and photosensitive element 30 that is established when photosensitive element 30 is mounted in a camera 20 and exposed through taking lens system 22. Expected image areas 47 are the direct on-axis projections of the individual micro-lenses 42 onto photosensitive element 30. As can be seen in FIG. 3, the further that the individual expected image areas 47 are from the intersection of optical axis and photosensitive element 49, the larger the displacement between the expected image areas 47 and the actual image areas 48. The extent of the displacement of the concentrated image elements 52 from the expected image areas 47 is controlled by the optical characteristics of the camera 20, taking lens system 22, and the micro-lenses 42. Methods and apparatus that can compensation for this displacement are described in the already cited co-pending and commonly assigned U.S. patent application. Ser. Nos. 10/167,794 and 10/170,148 cited above.

Figure 4:
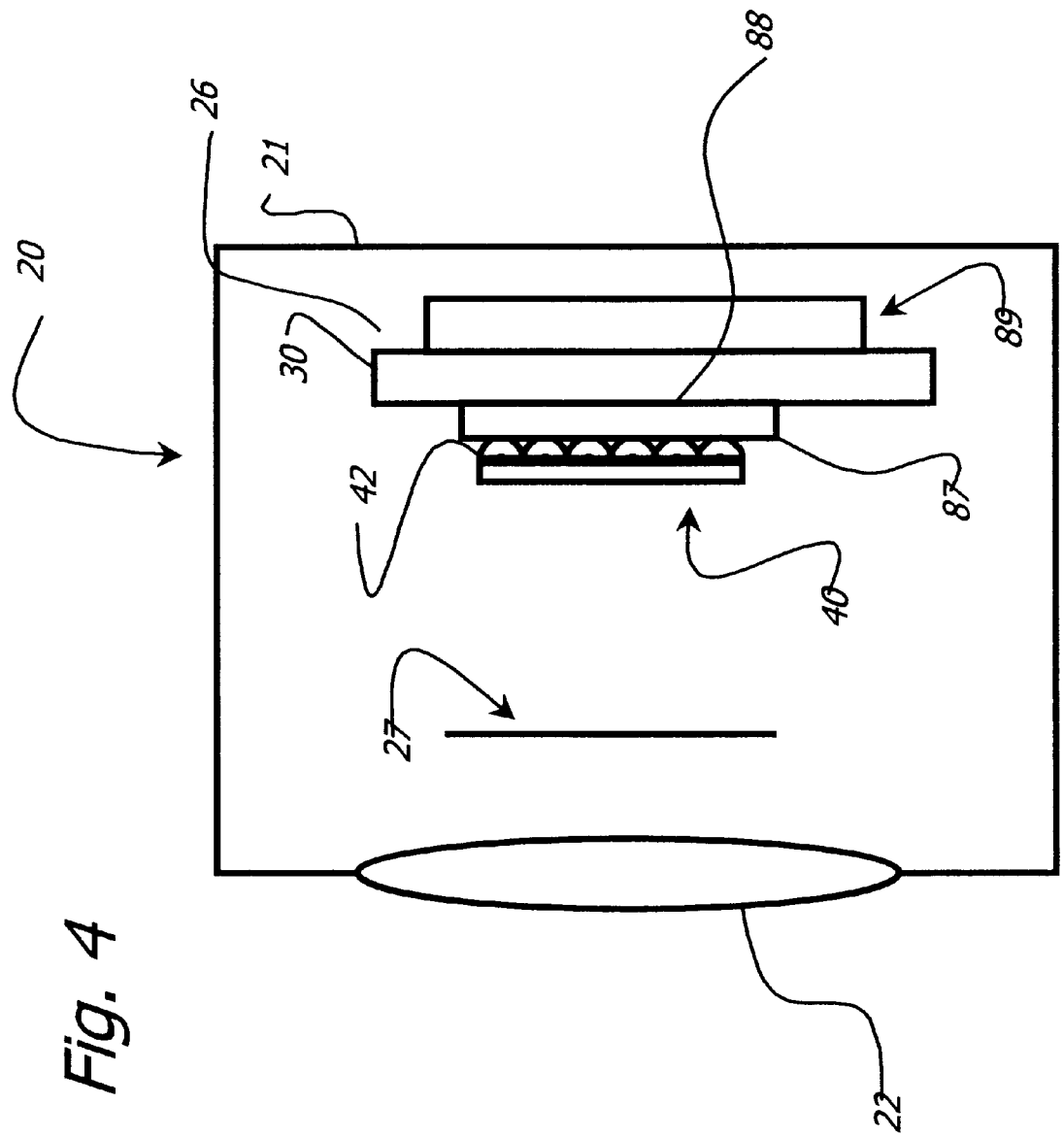
FIG. 4 shows a camera according to the invention.

FIG. 4 illustrates another embodiment of camera 20 according to the invention. Camera 20, has a taking lens system 22, a shutter assembly 27 for controlling light admission to the interior of camera body 21 and a micro-lens array assembly 40 positioned at the focal plane defined by primary lens system 22. The micro-lens assembly 40, has micro-lenses 42 with focusing surfaces 43 protruding away from the primary lens system 22 and toward photosensitive element 30. The individual micro-lenses 42 and the surrounding medium, typically air (not shown), define a focal plane offset from focusing surface 43 of micro-lenses 42. When camera 20 is loaded with photosensitive element 30, photosensitive element 30 is positioned and aligned by a film gate 26 at the focal plane defined by the individual micro-lenses 42 and the surrounding medium. Gate 26 serves to position and hold photosensitive element 30 for exposure. The focal length of the individual micro-lenses 42 is typically between 1 and 10 times the radius of curvature of the individual micro-lenses. In this embodiment, gate 26 comprises an optically transmissive spacer plate assembly 87 and pressure plate assembly 89. Positioning, flatness and alignment of photosensitive element 30 can be aided by positioning photosensitive element 30 against a photosensitive element contact surface 88. Photosensitive element contact surface 88 is adapted to contact photosensitive element 30 without damaging photosensitive element 30. Element contact surface 88 can, for example, have matte beads (not shown) distributed thereon as are known in the art of photography. Such matte beads can have a diameter of between 0.1 to 2 micro-meters and a distribution generally covering the surface area of element contact surface 88. Coatings of various materials can also be used, such as, for example, mineral oil, silicone oil and carnuba wax. Other materials that can usefully be used with contact surface 87 are described in a paper entitle "Coating Physical Property Modifying Addenda" IX published in Research Disclosure 38957, Volume 389 in September 1996. In the embodiment of FIG. 4, photosensitive element 30 is clamped against element contact surface 88 using a pressure plate assembly 89. The pressure plate assembly 89 can be formed by guides or rails integral to camera body 21. The spacer plate assembly 87 and pressure plate assembly can be individually or collectively reversibly compressible and act to passively position photosensitive element 30 relative to micro-lens assembly 40. It is recognized that insertion of spacer plate 87 introduces additional refractive surfaces which can be accommodated as is well understood in the optical arts.

FIG. 5 illustrates, with ray tracing, light concentration of a single instance of a micro-lens 42 with spacer plate assembly 87. Here two illustrative rays 51 collimated by the primary lens assembly 22 are shown as they interact with a single instance of a micro-lens 42 of micro-lens array 40. The rays 51 are nearly parallel as they strike light receiving surface 41 of the micro-lens array 40 and are converged while leaving the array by the convex focusing surface 43 of the individual micro-lens 42 to focus light that passed through plane 53 (corresponding to the projected area of a single micro-lens 42 and the expected image area 47) to a smaller concentrated image area 48 of photosensitive element 30.

When photosensitive element 30 is a silver halide film, the film stock can be supplied in roll form and the camera 20 can have a film advance mechanism (not shown) to sequentially supply unexposed portions of the film stock to gate 26 as known in the art. Gate 26 can be designed to enable exposure of rectangular portions (or image frames) of film stock, typically in an aspect ration of between 1.33:1 to 2:1 or even higher in panoramic formats. Gate 26, micro-lens array 40 and optional spacer 87 and pressure plate assembly 89 can have a modest radius of curvature to disposition film frame concave towards the primary lens system 22 so as to facilitate even film illumination during exposure and to facilitate film advance through the camera, both as known in the art. For example, U.S. Pat. No. 4,833,495 by Ohmura et al. illustrates a modestly curved film path that serves these needs. In other embodiment, a roll film can be drawn by tension across a spacer 87 that induces the desired curvature in the film. In other embodiments, arrangements of film rails, modestly curved transport paths and modest film stock tension, all as known in the art, can serve to position the film stock at an appropriate focal plane.

In the foregoing discussion, the use of an array 40 of micro-lenses 42 has been generally described. The individual micro-lenses 42 of array 40 are convergent lenses in that they are shaped so as to cause light to converge or be focused. In one embodiment, focusing surfaces 43 form convex projections from the array assembly or concave recesses into the array assembly. The individual projections are shaped as portions of perfect or imperfect spheres. Accordingly, the micro-lenses can be spherical portion lenses or they can be aspherical portion lenses or both types of micro-lenses can be simultaneously employed. A spherical portion micro-lens has the shape and cross-section of a portion of a sphere. An aspherical portion micro-lens has a shape and cross-section of a flattened or elongated sphere. The lenses are micro in the sense that they have a circular or nearly circular projection with a diameter of between 1 and 1000 microns. A cylindrical portion micro-lens has the shape and cross-section of a portion of a cylinder. An acylindrical portion micro-lens has a shape and cross-section of a flattened or elongated cylinder. In particular, the forgoing discussion has generally presumed and described the use of the present invention in concert with a close packed cubic micro-lens array 40 of spherical micro-lenses 42. It will be appreciated that various configurations of micro-lenses 42 and micro-lens array 40 can be used. FIGS. 6a–e and 7a–c illustrate several such configurations as viewed facing the light focusing surface 43. For example, FIG. 6 shows, conceptually, a micro-lens array 40, of micro-lenses 42 arranged in a uniform cubic close packed distribution pattern on a support 90. It will be appreciated that other array patterns can be used. For example, FIG. 6 shows an embodiment having an off-set square close packed array pattern. In another embodiment shown in FIG. 6 micro-lenses 42 are arranged in micro-lens array 40 having a hexagonal close packed array pattern. Micro-lens array 40 can also feature random distributions of micro-lenses 42. One embodiment of an array having a random distribution is shown in FIG. 6. As is also shown in FIG. 6, in still another embodiment, micro-lens array 40 can comprise an array of cylindrical or acylindrical micro-lenses 42.

Figure 7A:
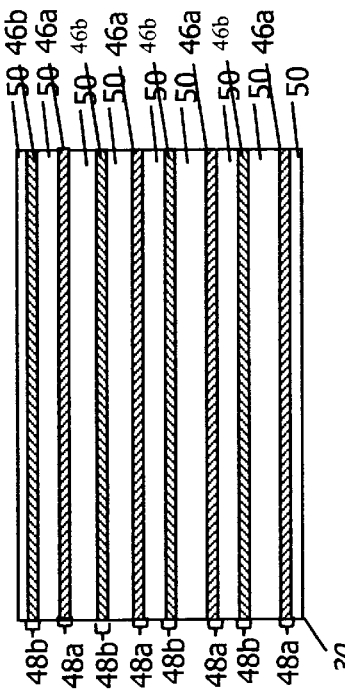
FIGS. 7a–7c illustrates various embodiments of arrays of different micro-lenses that can be usefully combined in a single array of micro-lenses.
Figure 7B:
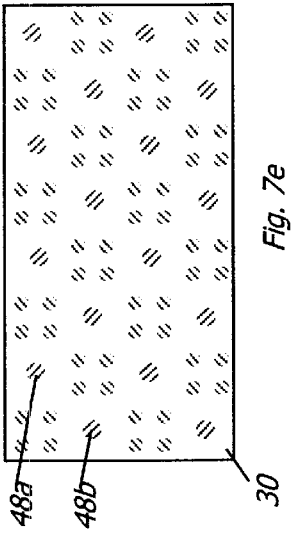
Figure 7C:
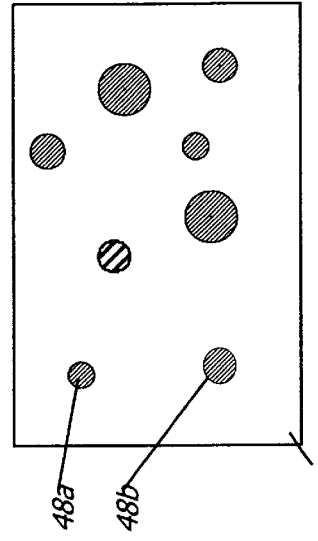
Figure 7D:
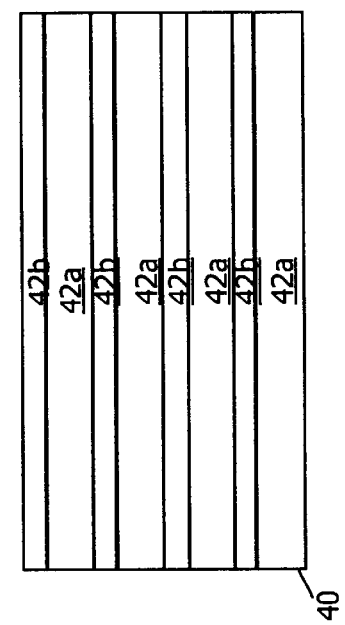
FIGS. 7d–7f illustrate patterns recorded on a photosensitive element by imagewise exposure of the photosensitive element to light from a scene passing through, respectively, the arrays of FIGS. 7a–7c.
Figure 7E:
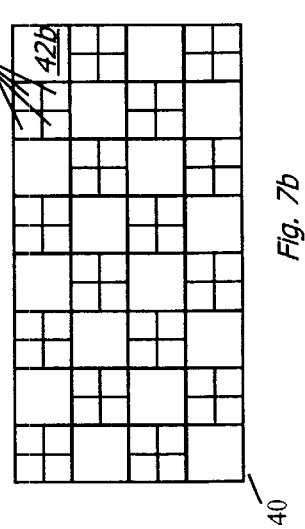
Figure 7F:
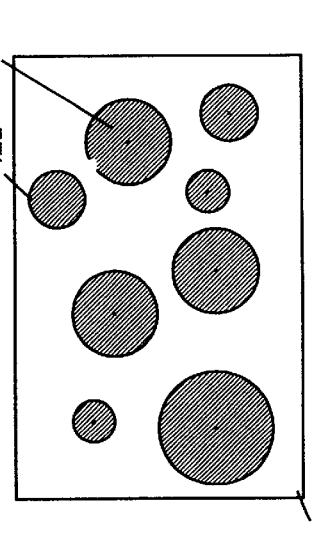

As is shown in FIGS. 7a, 7b and 7c, micro-lens array 40 can comprise micro-lenses 42 having different optical characteristics. In the embodiment of FIG. 7a, a micro-lens array 40 of cylindrical micro-lenses 42 is shown. As is shown in FIG. 7a, micro-lens array 40 has a first set of micro-lenses 42a that have a greater cross-section area than a second set of micro-lenses 42b also provided by micro-lens array 40. In this embodiment, the first set of microlenses 42a concentrate a greater portion of light during an exposure than micro-lenses 42b. Thus, the first set of micro-lenses 42a form a line image exposure on photosensitive element 30 as shown in FIG. 7d, in a first set of concentrated image areas 48a, when the amount of the light during the exposure is within a first exposure range 84. When a light from the scene within a second exposure range 86, the second set of micro-lens array 40b form a line image on photosensitive element 30 in a second set of concentrated image areas 48b. Light that is not concentrated by either set of micro-lenses 42a and 42b can form a residual image (not shown) in second exposure area 50 of photosensitive element 30 of FIG. 7a.

Similarly, FIGS. 7b and 7c each show the use of a micro-lens array 40 having differently sized sets of microlenses 42a and 42b with the micro-lens array 42a concentrating light to form an exposure and directing that light onto concentrated image areas 48a on photosensitive element, while micro-lenses 42b concentrate light from a scene and direct this light onto concentrated image areas 48b on photosensitive element 30. Here too, residual portions of the light are recorded in residual exposure areas 50 of photosensitive element 30. Thus, in this embodiment the effective sensitivity of the photosensitive element 30 can be further extended.

As is shown in FIG. 7c, the surface coverage of microlenses 40 does not have to be maximized. While any useful surface coverage of microlenses 40 can be employed, the ratio of the projected area of the micro-lenses 40 to the projected area of the photographic or photosensitive element 30, can be at least 20 percent. In one embodiment, the coverage can be between at least 50 percent and up to 85 percent. In another embodiment, surface coverage of 85 percent up to the close-packed limit can be used. The precise degree of surface coverage can be adjusted to enable varying levels of exposure sensitivity while maintaining useful photographic graininess and sharpness. In any embodiment where the surface coverage is less than the close packed limit, support 90 can be defined to allow residual light to strike photosensitive element 30.

Micro-lens array 40 can comprise a set of individual micro-lenses 42 that are formed together or joined together, for example by extrusion, injection molding and other conventional fabrication techniques known to those in the art. Micro-lens array 40 can also be formed by combining a plurality of separate micro-lenses 42 fixed together by mechanical or chemical means or by mounting on support 90. Micro-lens array 40 can comprise a set of beads or spheres (not shown) that are positioned proximate to or coated onto a supporting structure. The micro-lenses 42 may be formed in any matter known in the microstructure art. These micro-lenses 42 may be unitary with the array structure as for example by being embossed or molded directly into the array structure at manufacture or they may be integral to a distinct layer applied to a supporting structure. In still other embodiments, a micro-lens array 40 can be formed using a photosensitive coating.

FIGS. 8a–8c shows a cross-sectional view of microlenses 42 have a convex focus surface and their structural support 90 and exhibiting example embodiments of various spherical and aspherical micro-lenses 42. FIG. 8a shows an embodiment wherein micro-lenses 42 comprise spherical lenses joined by support 90. FIGS. 8a and 8c show embodiments of micro-lens array 40 having aspherical micro-lenses 42. It is appreciated that any of the above described array patterns may be combined with aspherical micro-lenses 42 to provide extended sensitivity. Further, any of the patterns of micro-lenses 42 can be applied in a non-close packed manner to enable extended photographic sensitivity The micro-lenses 42 are shown with distinct hatching to illustrate the spherical and aspherical character of the protruding portion that actually forms the micro-lens. Aspherical micro-lenses 42, of the type shown in FIGS. 8b and 8c, are especially useful for this application in that the variable radius of such lenses allows for control of the lens focal length and lens aperture nearly independently of the spacing between the micro-lenses and the light sensitive layers. While these cross-sections have been described as spherical or aspherical, it is fully appreciated that the diagrams equally represent in cross-section cylindrical or acylindrical microlenses 42. In each embodiment of array 40 shown in FIGS. 8a–8c light focusing surface 43 focuses light that enters light receiving surface 41.

The light concentration or useful photographic speed gain on concentrating light focused by taking lens system 22 with a circular projection micro-lens 42 is the square of the ratio of f-numbers of the camera 20 and the micro-lenses 42. Speed gain (in log relative Exposure) in such a system can be determined as the speed gain equals 2×log (camera lens f-number/micro-lens f-number). The light concentration or useful photographic speed gain of cylindrical micro-lenses allow only the square root of such an improvement because they concentrate light in only one direction. The concentration of light by micro-lens array 40 enables both a system speed gain and forms an exposure pattern on the light sensitive material.

The dimensions of camera 20 and the detailed characteristics of the taking lens system 22 dictate the lens pupil to image distance, i.e. the operating camera focal length. Preferably, image 25 is formed at the micro-lens array 40 of micro-lenses 42. The characteristics of micro-lenses 40 dictate their focal length. The micro-lens images are formed at the light sensitive layers of photosensitive element 30. The f-number of camera taking lens system 22 controls the depth-of-focus and depth-of-field of camera 20 while the micro-lens f-number controls the effective aperture of camera 20. By using a stopped down f-number for the camera lens, excellent sharpness along with wide depth of focus and depth of field are obtained. By using an opened f-number for micro-lens array 40, high system speed is obtained with emulsions that are typically thought of as "slow." This extra speed allows available light photography without the thermal and radiation instability typically associated with "fast" emulsions.

Accordingly, a useful combination of camera taking lens 22 and micro-lenses 42 f-numbers will be those that enable system speed gains. System speed gains of more than 0.15 log E, or ½-stop, are useful, while system speed gains of 0.5 log E or more are preferred. While any micro-lenses 42 having an f-number that enables a speed gain with a camera taking lens 22 having adequate depth-of-field for an intended purpose can be gainfully employed, typically micro-lenses 42 having f-numbers of 1.5 to 16 are useful. In certain embodiments, micro-lenses 42 having f-numbers in the range of f/2 to f/7 are useful. In other embodiments, micro-lenses 42 having f-numbers in the range of f/3 to f/6 are preferred.

Preferred design parameters for micro-lenses 42 and their relationship to the light sensitive layers of a photosensitive element 30 follow from these definitions:

Micro-lens radius is the radius of curvature of the hemispheric protrusion of micro-lenses 42. For aspherical micro-lenses 42 this value varies across the surface of the micro-lens.

Micro-lens aperture is the cross sectional area formed by the microlens typically described as a diameter. For spherical micro-lenses this diameter is perforce less than or equal to twice the micro-lens radius. For aspherical microlenses this diameter can be greater than twice the smallest radius encountered in the micro-lens. Use of differently sized micro-lenses having distinct apertures enables distinct levels of speed gain on a micro-scale and thus enables extended exposure sensitivity for a photographic layer.

Micro-lens f-number is the micro-lens aperture divided by the micro-lens focal-length. For spherical micro-lenses, the desired micro-lens focal length can be used to define an appropriate micro-lens radius following a lens equation, thusly:

Micro-lens radius is the micro-lens focal-length times $(n_2-n_1)/n_2$; where $n_1$ is the refractive index of the material outside the micro-lens (typically air with a refractive index of unity) while $n_2$ is the refractive index of the micro-lens and any contiguous transmissive material e.g. (plastics as used in micro-lens array 40). While glasses, minerals and plastics having a refractive index of 1.4 to 1.6 are specifically contemplated, any known transmissive materials with appropriate mechanical properties can be employed. Following the known refractive indices of typical photographic system components, useful spherical micro-lenses will have a micro-lens focal length about 2 times the micro-lens radius $((n_2-n_1)/n_1 \sim \frac{1}{2})$. In this context, it is appreciated that aspherical micro-lenses 42 enable a greater degree of design flexibility in adjusting micro-lens aperture and focal length to the other system requirements. When there are intervening structures, as for example the spacer plate assembly 87, they can be on the order of 10 to 800 microns or more in thickness. In the embodiment of FIG. 1, the micro-lens array 40 of micro-lenses 42 is separate from photosensitive element 30 and is separately mounted in camera 20 between camera taking lens system 22 and gate 26. In this embodiment, the focal length is dictated by the differences in refractive index between the micro-lens material and the surrounding medium, typically air and the micro-lens radius of curvature. Additional details can be found in the cross-referenced and commonly assigned U.S. patent application Ser. Nos. 10/167,746 and 10/170,148, the disclosures of which are incorporated by reference.

Micro-lens focal length sets the preferred distance from micro-lenses 42 and photosensitive layers of photosensitive element 30. The distance from the light focusing surface 43 of the micro-lens array 40 to the near surface of the photosensitive element 30 will generally be between 0.5 and 5 time the micro-lens focal length and preferably between 0.7 and 2 times the micro-lens focal length and most preferably between 0.9 and 1.5 times the micro-lens focal length. The near focal length of the micro-lens array is the closest approach between the light focusing surface 43 and the photosensitive element 30 that forms an adequate photographic image while the far focal length the far focal length of the micro-lens array is the farthest approach between the light focusing surface 43 and the photosensitive element 30 that forms an adequate photographic image. This distance can be maintained for example, using a gate structure 26 or spacer plate 87 which positions photosensitive element 30 apart from the focusing surfaces. Spacer plate 87 and pressure plate assembly 89 can also be used. In one embodiment the distance between the micro-lens light focusing surface 43 and photosensitive element 30, i.e. the near focal length can be between 5 and 1500 microns. In other embodiments, the distance can be between 10 and 800 microns. In still other embodiments, the distance can be 20 and 400 microns.

While any useful number of micro-lenses 42 can be employed per image frame to achieve the desired results, it is recognized that the actual number to be employed in any specific configuration depends on the configuration. Microlens apertures or pitches of 3 to 100 microns can be used. Where images are to be recorded on a 135-format frame, roughly 24 by 36 mm in extent, about 86 thousand and 96 million micro-lenses can be used to provide full surface coverage.

Since the photosensitive layers 32 of photosensitive element 30 have a finite thickness, it is appreciated that use of micro-lenses 42 can enable distinct color records of a multilayer multicolor color film to be preferentially enhanced for sensitivity. This feature arises because of the finite thickness of the light sensitive layers of a color film and the layerwise sequential arrangement of the color records of a camera speed color light sensitive material suitable for use in hand held cameras. The light sensitive layers are typically between 15 and 45 microns in thickness in a dry state and the layers which form the blue sensitive color record are typically arranged nearest to an exposure source while the layer which form the red sensitive color record are typically arranged farthest from an exposure source of all the color records. The layerwise enhancement of sensitivity can be especially important in specific unbalanced lighting situations such as dim incandescent lighted interiors that are blue light poor and red light rich. In systems intended for incandescent photography the micro-lenses can be focused on the film's blue sensitive layers thus providing a preferential speed boost to the color record and improved color balance. Conversely, in systems intended for underwater photography, which are red light poor and blue light rich, the micro-lenses can be preferentially focussed on the film's red sensitive layers thus providing a preferential speed boost to the color record and improved color balance. In other situations, other colors can be preferentially boosted. Films can be provided with uncommon layer orders to be employed specifically with micro-lenses providing exposure boosts to specific depth wise regions of a layerwise film.

Light from the scene can be passed through more than one array of micro-lenses 40. For example, light from the scene can be passed through a first micro-lens array having hemi-cylindrical micro-lenses arrayed along a horizontal axis and then passing this compressed light through a second micro-lens array having hem-cylindrical micro-lenses arrayed along a vertical axis. This technique can be usefully employed to cause bi-axial concentration of the light from the scene.

As is noted above, the images recorded on photosensitive element 30 in accordance with the embodiments of the present invention, although viewable, are intended for machine reconstruction into a directly viewable form. In this regard, camera 20 has been shown in FIG. 1 as incorporating a camera controller 62 that cooperates with a light sensor 60, lens position detector 63, photosensitive element type sensor 64 and communication head 66 to record information on photosensitive element 30 that indicates that photosensitive element 30 is to be photofinished in a manner that permits conversion of the machine readable image into a form that is suitable for direct viewing. Methods and apparatuses for optically and electronically extracting directly viewable images from such machine readable images are described in greater detail in these applications. As noted in the cross-referenced cases, information regarding scene brighteners and lens position may also be useful in the reconstruction process and therefore, may be recorded on photosensitive element 30.

Details of scene luminance fractionation and reconstruction along with micro-lens sizing, shape and optical properties are disclosed in cross referenced and commonly assigned U.S. patent application Ser. Nos. 10/167,746 and 10/170,148, the disclosure of which are incorporated by reference.

The invention has been described in detail with particular reference to certain preferred embodiments thereof, but it will be understood that variations and modifications can be effected within the spirit and scope of the invention.

Parts List 20 camera
21 camera body
22 taking lens system
23 aperture
24 scene
25 image of scene
26 gate
27 shutter system
30 photosensitive element
32 photosensitive layer
34 substrate
36 imaging area
38 photoprocessed element
40 micro-lens array
42 micro-lenses
41 light receiving surface
44 concentrated fraction
43 light focusing surface
45 optical axis
46 residual fraction
47 expected image areas
48 concentrated image areas
49 intersection of optical axis and photosensitive element
50 residual image area
51 light ray
52 concentrated image elements
53 light ray
55 plane corresponding to the projected area of one micro-lens
54 residual image
60 light sensor
62 controller
63 lens position detector
64 photosensitive element type sensor
66 communication head
70 scene luminance range
72 actual latitude of photosensitive element
74 lower response threshold
76 upper response threshold
78 latitude desired for photographic element
80 lower response threshold of desired latitude
82 upper response threshold of desired latitude
84 first exposure range
86 second exposure range
87 spacer plate
88 element contact surface
89 pressure plate assembly
90 support

What is claimed is:

1. A camera comprising:
    a primary lens adapted to focus light from a scene;
    an array of micro-lenses with each micro-lens in the array having a light receiving surface to receive light from the primary lens and a light focusing surface confronting a photosensitive element, with the light focusing surface adapted to concentrate the received light onto the photosensitive element;
    a spacer positioning the photosensitive element separate from the light focusing surfaces; and
    a shutter assembly adapted to controllably pass light from the scene to the array of micro-lenses.

2. The camera of claim 1, wherein the spacer separates the photosensitive element between 5 and 1500 micro-meters from the light focusing surfaces of the photosensitive element.

3. The camera of claim 2, wherein the spacer comprises a light transmissive surface.

4. The camera of claim 1, wherein the spacer has a contact surface having surface coatings adapted to engage the photosensitive element.

5. The camera of claim 1, wherein the contact surface has materials to protect the photosensitive element.

6. The camera of claim 1, further comprising a photosensitive element.

7. The camera of claim 5, wherein the contact surface has a material to protect the photosensitive elements comprising at least one of a matte bead, a mineral oil, a silicone oil and carnuba wax.

8. The camera of claim 1, wherein the array of micro-lenses has a concave curvature inward toward the primary lens and the contact surface is adapted to engage the photosensitive element to induce a curvature in the photosensitive element that corresponds to the curvature of the array of micro-lenses.

9. The camera of claim 1 further comprising a pressure plate opposing a contact surface with a pressure plate adapted to clamp the photosensitive element against the contact surface.

10. The camera of claim 1, wherein the photosensitive element is positioned at a separation from the micro-lenses that concentrates the light by a factor of at least 0.15 log E.

11. The camera of claim 1, wherein the photosensitive element is positioned at a separation from the micro-lens of between 10 and 800 micro-meters.

12. The camera of claim 1 wherein the light receiving surfaces are integrated to form an array support.

13. The camera of claim 1 wherein the array support comprises a substantially transparent surface having a thickness between 0.05 and 20 millimeters.

14. A camera for recording images on a photosensitive element, the camera comprising:
    a primary lens adapted to focus light from a scene to form an image of the scene at an imaging plane;
    a shutter assembly adapted to controllably pass light from the scene to the imaging plane;
    an array of micro-lenses with each micro-lens having a receiving surface positioned at the imaging plane adapted to receive light from the primary lens and with each micro-lens a focusing surface adapted to focus received light to form an image between a near focus distance and a far focus distance; and
    a gate positioning the photosensitive element between the near and far focus distances, at a distance between 5 and 1500 micro-meters from the focusing surface of the micro-lenses.

15. The camera of claim 14 wherein gate comprises a transparent spacer and a back plate to hold the photosensitive element against the spacer.

16. The camera of claim 14, wherein the photosensitive element is positioned at a separation from the micro-lenses that concentrates the light by a factor of at least 0.15 Log E.

17. The camera of claim 14, wherein the photosensitive element is positioned at a separation from the micro-lens of between 10 and 800 microns.

18. A camera for recording images on a photosensitive element having an emulsion for recording an image when exposed to light within a predefined range of exposures, the camera comprising:
    a camera body having a primary lens system comprising an aperture for controllably admitting and focusing light from a scene;

a camera photosensitive element gate adapted to position the photosensitive element to confront the aperture;

an array of micro-lenses disposed between said aperture and said photosensitive element gate, with said array having a light receiving surface to receive light from the aperture and to pass the received light through a light focusing surface to the photosensitive element, wherein the light focusing surface is adapted to fracture light from a scene into a first fraction and a second fraction with the first fraction of light from the scene concentrated to form a first image on a first portion of the photosensitive element when exposure intensity is within a first range, with said second fraction of light from the scene passing onto the photosensitive element to form a second image on a second portion of the photosensitive element when light from the scene is within a second range; and a shutter controllably permitting light from the scene to expose the photosensitive element for a predefined period of time, said predefined period of time being defined as sufficient to form an image on said second portion of the photosensitive element when light from the scene is within the second range.

19. The camera of claim 18 wherein the light receiving surface comprises an array support.

20. The camera of claim 18 wherein the array support comprises a substantially transparent surface having a thickness between 0.05 and 20 millimeters.

* * * * *